Feb. 3, 1970        F. SHIRES        3,493,393
METHOD OF PRODUCING AN EGG PRODUCT
Filed Sept. 27, 1967
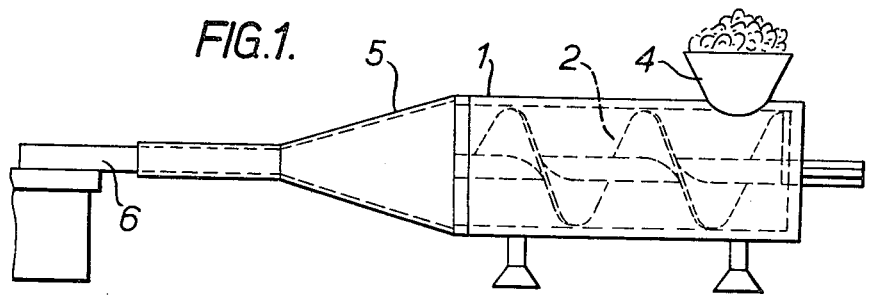
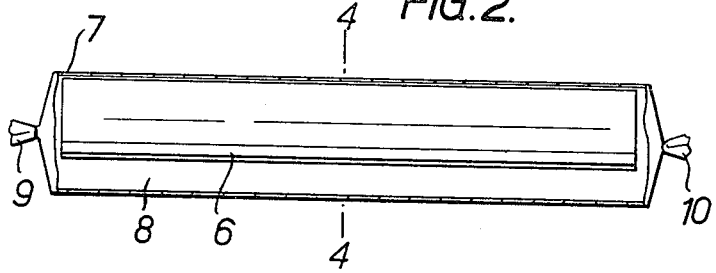
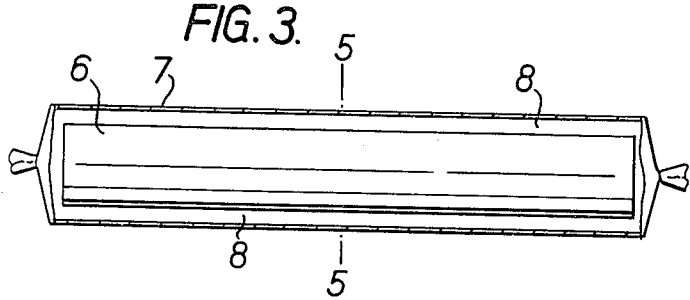
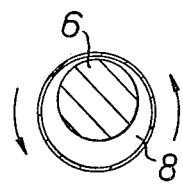
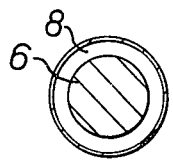
INVENTOR
FRANK SHIRES
BY
Morgan, Finnegan, Durham & Pine
ATTORNEYS United States Patent Office 3,493,393
Patented Feb. 3, 1970

3,493,393
METHOD OF PRODUCING AN EGG PRODUCT
Frank Shires, Deanway, Chalfont St. Giles, England, assignor to Dell Foods Limited, Chalfont St. Giles, England, a British company
Filed Sept. 27, 1967, Ser. No. 670,840
Claims priority, application Great Britain, Sept. 27, 1966, 43,020/66
Int. Cl. A23j 1/08; A23b 1/02, 5/04
U.S. Cl. 99—113         9 Claims

ABSTRACT OF THE DISCLOSURE

A method for producing an egg product in the form of a central core of egg yoke surrounded by an annular layer of egg white which is more readily and conveniently adapted for use than is the product in its natural untreated form, for example, as an egg in the shell.

---

The invention relates to a method for producing an egg product in the form of a central core of egg yolk surrounded by an annular layer of egg white.

The invention has among its objects to provide an egg product in such a form as to make it more readily and conveniently adapted for use than is the product in its natural untreated form, such, for example, as an egg in the shell.

In the use of a natural egg which is hard-boiled so as to be adapted to be cut into sections for use in salads, sandwiches, meat pies, egg pies and the like, there is a disadvantage that the egg in its natural form and shape is difficult, after removal from the shell, to cut in such way as to provide equal distribution of the yolk and white in the slices, as the yolk to white ratio in the sliced egg varies from a maximum yolk content in the middle of the egg to none at the ends.

Again in the case of a meat pie one slice of the pie may contain a large preponderance of egg whereas another slice may contain no egg at all. In the case of oblong shapes each slice contains a varying amount of egg and varying amount of yolk and white.

The invention has among its objects to provide an egg product comprising a yolk surrounded by a layer of white, or a product such as a Scotch egg containing yolk and white surrounded by a layer of sausage meat, in such manner that it can be cut so that each slice contains substantially the same amount of constituents.

The invention has further among its objects to enable the amounts of the various constituents to be varied as desired. Thus it is an object of the invention to provide a method whereby the ratio of yolk to white may be varied as desired.

A further object of the invention is to enable materials or substances to be added to the constituent substances of the product. Thus for example flavouring, spices and the like may be added to the yolk or the white in producing an artificial egg.

In my earlier United States Patent No. 3,285,749, there is described a method for the production of an egg product which comprises the steps of separating egg yolk from egg white, heating the egg yolk in its natural membrane until cooked firm, moulding the cooked egg yolk to form an elongated body, locating the egg yolk body concentrically within an annular body of egg white, and coagulating the egg white.

The elongated body of egg yolk is formed within a thin plastic tube or casing. The cylindrical body or stick of yolk so produced is then mounted concentrically in a larger casing whereby the annular layer of egg white may be formed about the central body of yolk. Such axial alignment of the yolk core is effected by means of stainless steel pins which are inserted in axial alignment in the ends of the stick of yolk.

My present invention constitutes an improvement of the invention disclosed in my said earlier patent whereby the production of the egg product is simplified with a consequent reduction in the cost of egg product.

According to the invention, the stick of egg yolk which is to form the core of the egg product is produced by feeding crystallised yolks through a nozzle so that a stick of yolk is extruded from the nozzle.

According to the invention furthermore, a length of the extruded stick of egg yolk, preferably after it has been frozen so as to facilitate its handling, is then placed in a container which is otherwise filled with egg white and the container, with its ends closed and with its major axis horizontal, is heated to coagulate the egg white whilst the container is rotated about its main axis. It has been found that in this manner the stick of egg yolk is caused automatically to centre itself with respect to the egg white.

The invention is hereinafter described by way of example with reference to the accompanying drawings. In so far as is necessary or desirable, the description of the yolk, egg white, coagulating steps, and the nature of the egg product given in the said United States Patent No. 3,285,749 is hereby incorporated into the present Specification.

In the drawings,

FIGURE 1 shows means for extruding a stick of egg yolk;

FIGURE 2 shows the first step in coagulating the egg white;

FIGURE 3 shows the finished egg product;

FIGURE 4 is a section on the line AB of FIGURE 2, and

FIGURE 5 is a section on the line CD of FIGURE 3.

Referring to FIGURE 1 of the drawings, the means for forming a stick of egg yolk comprises an extrusion apparatus 1 having a screw or worm 2 driven from a motor, not shown, by means of a drive shaft 3. Crystallised egg yolks are fed into the extruder from a hopper 4 and are moved axially by the worm 2 into and through a constriction or nozzle 5. As used herein, the term "crystallised egg yolk" is intended to mean an egg yolk which has been cooked in its membrane by being placed in boiling or near-boiling water so as to have the same crystalline structure as in a natural hard-boiled egg.

The egg yolks are then bound together by the compression they undergo as they pass through the nozzle 5 and they emerge from the nozzle as an integral stick 6 which is received on a table or slab.

Referring to FIGURES 2 to 5 of the drawings, a stick of egg yolk which has been extruded in the apparatus shown in FIGURE 1 and subsequently frozen, is positioned in a cylindrical container 7 of flexible synthetic plastics material, such as polyethylene, which is filled with egg white 8, the ends 9 and 10 of the container being then sealed in any convenient manner. The egg white may be placed in the container 7 before, simultaneously with or after the stick of egg yolk. The container is then positioned with its major axis horizontal and the egg yolk rises to the top of the container due to its lower specific gravity. The container is then heated to coagulate the egg white, for example by immersing in hot water, during which time the container is rotated as indicated by the arrows in FIGURE 4. As the egg white gradually thickens during the process of coagulation, it forces the egg yolk stick towards the centre of the container so that when the white has finally set the yolk lies substantially in the centre or along the major axis of the container 7. The outer container may then be removed or it may be retained on the egg product until the latter is used.

It has been found that as an alternative to rotating the container in boiling or near-boiling water the egg yolk stick can be centred by rotating the container in a freezing cabinet or tunnel. As the white of egg freezes and thickens it forces the egg yolk stick into the centre and the egg product may then be kept in deep-freeze until required for use when it is placed in boiling water until the white of egg is defrosted and cooked.

Instead of using a flexible plastics casing for the egg white, a rigid tube or stainless steel which has been treated internally with a non-stick or release agent may be used. It is also possible to use containers made from other metals or materials, resinous or otherwise, provided that they are inert.

I claim:

1. A method for the production of an egg product, which comprises disposing egg white and an extruded stick of crystallised egg yolk in an elongated container whereby the container is substantially full when sealed, and heating the container with its major axis substantially horizontal until the egg white is coagulated, the container being rotated about its main axis during coagulation of the egg white.

2. A method according to claim 1, in which the said container is a tubular film of a flexible, synthetic resin.

3. A method for the production of an egg product, which comprises feeding crystallised egg yolks into a screw extruder, extruding the egg yolks in the form of a stick, freezing the said stick, placing the frozen stick in an elongated container which is otherwise filled with uncoagulated egg white, the frozen stick lying lengthwise of the container, heating the container with its main axis horizontal to coagulate the egg white, and during the coagulation of the egg white rotating the container about its main axis in such manner that the stick of egg yolk lies substantially centrally of coagulated egg white.

4. A method according to claim 3, in which the container is heated by immersion in hot water.

5. A method for producing an egg product from natural egg yolks and egg white, comprising the steps of separating raw egg yolks and egg white, heating the egg yolks in their natural membranes until cooked firm, extruding the cooked egg yolks into an elongated body, disposing said elongated egg yolk body together with egg white in an elongated container which is thereby substantially filled and forms a container of circular cross-section, heating the elongated container with its main axis horizontal until the egg white is cooked firm, and during said heating rotating the said container about its main axis whereby the elongated egg yolk body lies substantially centrally of firm-cooked egg white.

6. A method for the production of an egg product, which comprises disposing egg white and an extruded stick of crystallised egg yolk in an elongated container whereby the container is substantially full when sealed, rotating the container about its major axis, with the major axis substantially horizontal, in a freezing medium until the egg white is coagulated.

7. A method according to claim 6, in which the said container is a tubular film of a flexible, synthetic resin.

8. A method for the production of an egg product, which comprises feeding crystallised egg yolks into a screw extruder, extruding the egg yolks in the form of a stick, freezing the said stick, placing the frozen stick in an elongated container which is otherwise filled with uncoagulated egg white, the frozen stick lying lengthwise of the container, rotating the container about its major axis, with the major axis substantially horizontal, in a freezing medium until the egg white is coagulated.

9. A method for producing an egg product from natural egg yolks and egg white, comprising the steps of separating raw egg yolks and egg white, heating the egg yolks in their natural membranes until cooked firm, extruding the cooked egg yolks into an elongated body, disposing said elongated egg yolk body together with egg white in an elongated container which is thereby substantially filled and forms a container of circular cross-section, rotating the container about its major axis, with the major axis substantially horizontal, in a freezing medium until the egg white is coagulated.

References Cited

UNITED STATES PATENTS 3,285,749   11/1966   Shires _____ 99—113

A. LOUIS MONACELL, Primary Examiner

W. R. BOVEE, Assistant Examiner

U.S. Cl. X.R.

99—196